Nov. 13, 1923.

B. B. GOLDSMITH

INK CARTRIDGE

Original Filed July 22, 1921

1,473,700

Byron B. Goldsmith
INVENTOR

BY H. M. MacKay
ATTORNEY

Patented Nov. 13, 1923.

1,473,700

UNITED STATES PATENT OFFICE.

BYRON B. GOLDSMITH, OF NEW YORK, N. Y.

INK CARTRIDGE.

Application filed July 22, 1921, Serial No. 486,902. Renewed January 20, 1923.

*To all whom it may concern:*

Be it known that I, BYRON B. GOLDSMITH, a citizen of the United States, residing in New York, county and State of New York, have invented a certain Improvement in Ink Cartridges, of which the following is a specification.

The present invention relates to a novel and improved means for convenient and instant production of a clear strong fluid ink.

The inconvenience, expense and waste incident to the shipping and storage of fluid ink have long been realized, and there is a wide field of usefulness for a perfectly reliable, inexpensive and conveniently usable device adapted to the immediate production of a good fluid ink by the mere application of water as and when wanted.

The present device meets these needs, and makes it commercially possible to manufacture and distribute the constituents of a good practical ink, without the expense and waste incident to marketing fluid ink in bottles.

My improved cartridge may be given any convenient form, and may be used in a great variety of combinations without departing from my invention.

Figure 1:
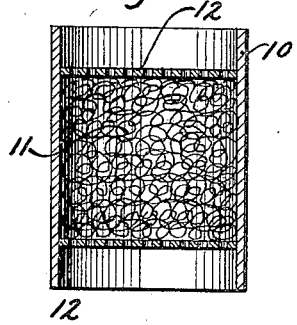
Figure 2:
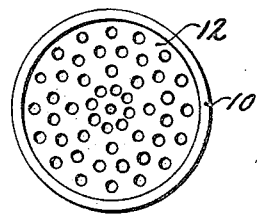
Figure 3:
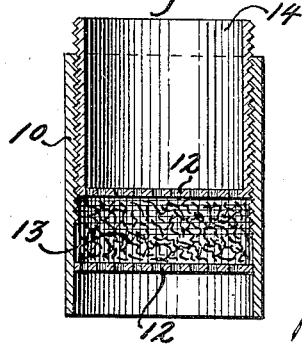

A simple form of the invention is illustrated by way of example in the accompanying drawings, wherein Figure 1 is a longitudinal sectional view of one form of cartridge, Figure 2 is an end view of the same, and Figure 3 is a longitudinal sectional view of a modified form. It is to be understood that these figures show the device on an exaggerated scale for greater clearness.

In Figures 1 and 2 a cartridge is shown having a cylindrical shell 10 which may be of glass, hard rubber or other suitable material. The dimensions of this shell may be varied in accordance with the nature of the ink-producing material, its quantity, the strength of ink required, etc.

Within the shell 10 is placed a packing 11 of filamentary material either coated or impregnated with a suitable ink-producing solid or semi-solid.

If the filamentary foundation is absorbent, it may be both impregnated and coated with ink-producing material.

In the form shown in Figures 1 and 2 a number of long threads, hairs, wires or filaments of the nature just described are wound or recurved upon themselves in matted form, which can be packed as tightly or as loosely as desired within the shell 10. I prefer to cover the two ends of the packing thus formed with perforated partitions 12, fitting the shell 10.

A cartridge of this nature will enable the user to produce a good serviceable fluid ink instantly by causing a stream of water to flow through the cartridge in any desired manner. The water may be simply poured through the shell, emerging as fluid ink, or the shell may be employed with any form of ink stand or fountain pen or receptacle which supplies water more or less rapidly to the shell. These cartridges are ink-producing units which may be combined in groups of two or more in a variety of ways which will be obvious to those skilled in the art.

In Figure 3 is shown a modified form in which a multitude of short lengths of ink-producing filaments are grouped to form a packing 13, within the shell 10. Such filaments may be entirely composed of ink-producing material.

In any case, it will be readily understood that a definite controllable percolating space will be afforded between and among the contacting ink-producing parts, through which water may be made to pass so as to gather the coloring constituent of a practical writing fluid. The performance of such a device can be determined once for all by experiment, and the proper dimensions, quantity and tightness of packing can be determined upon and adopted for the particular ends had in view.

If desired, the whole device can be made of materials of so cheap a nature as to make it possible to throw away the shell and packing when no longer useful.

If desired one or both of the partitions 12 may be fitted so as to be capable of being pressed inward after partial use. By this means of tightness of the packing, which may be impaired by removal of ink-producing material, may be restored, and the percolating space may be constantly preserved in a condition to yield good ink until almost the last particle of ink-producing material has been consumed. One means for facilitating this operation is shown in Figure 3, and is, of course, capable of use with the form of packing shown in Figure 1.

This consists in furnishing an interior shell 14, having one of the partitions 12 at one end, and threaded so as to be capable of being gradually screwed into the outer shell 10, to tighten the packing. I do not limit myself to this expedient for this purpose.

It is not essential to the invention that all of the filaments should be entirely coated or impregnated with ink-producing material, and it is entirely consistent with the invention that entirely uncoated or neutral bodies should be mixed in the mass.

What I claim is—

1. An ink cartridge having an inlet and an outlet opening and an assemblage of ink-producing bodies between said openings grouped in contact so as to leave a percolating space between said bodies.

2. An ink cartridge having an inlet and an outlet opening and an assemblage of ink-producing filaments between the openings grouped in contact so as to leave a percolating space between the filaments.

3. An ink cartridge comprising a tube, an assemblage of ink-producing filaments in said tube and a perforated partition across the interior of said tube adapted to confine the ink-producing filaments.

4. A cartridge as in claim 3 in combination with means for varying the tightness of the packing at will.

5. A cartridge as in claim 3 wherein two perforated partitions are employed, one at least of which is made movable within the tube to vary the pressure on the filaments.

6. An ink cartridge comprising a threaded shell, an ink-producing packing therein and compressing means for the packing screwing into said shell.

7. A cartridge as in claim 3 wherein some of the filaments comprise a core of neutral material and a coating of ink-producing material.

In testimony whereof I have hereto set my hand on this 19th day of July 1921.

BYRON B. GOLDSMITH.